United States Patent
Briesch et al.

(10) Patent No.: US 7,299,619 B2
(45) Date of Patent: Nov. 27, 2007

(54) VAPORIZATION OF LIQUEFIED NATURAL GAS FOR INCREASED EFFICIENCY IN POWER CYCLES

(75) Inventors: Michael S. Briesch, Orlando, FL (US); Gerald J. Feller, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 420 days.

(21) Appl. No.: 11/007,505

(22) Filed: Dec. 8, 2004

(65) Prior Publication Data

US 2005/0223712 A1    Oct. 13, 2005

Related U.S. Application Data

(60) Provisional application No. 60/529,250, filed on Dec. 13, 2003.

(51) Int. Cl.
F02C 7/08    (2006.01)
F02G 3/00    (2006.01)
F02G 1/00    (2006.01)

(52) U.S. Cl. .................................. 60/39.5; 60/728
(58) Field of Classification Search .................. 60/772, 60/780, 728, 39.5, 39.465
See application file for complete search history.

(56) References Cited

U.S. PATENT DOCUMENTS

| | | | |
|---|---|---|---|
| 3,183,666 A | | 5/1965 | Jackson |
| 3,293,850 A | | 12/1966 | Morrison |
| 3,438,216 A | | 4/1969 | Smith |
| 3,621,656 A | | 11/1971 | Pacault et al. |
| 3,720,057 A | * | 3/1973 | Arenson ...................... 60/772 |
| 3,726,085 A | * | 4/1973 | Arenson ...................... 60/772 |
| 3,796,045 A | | 3/1974 | Foster-Pegg |
| 3,978,663 A | * | 9/1976 | Mandrin et al. .............. 60/728 |
| 3,992,891 A | * | 11/1976 | Pocrnja ...................... 62/50.3 |
| 4,329,842 A | * | 5/1982 | Hoskinson ............... 60/39.465 |
| 4,995,234 A | | 2/1991 | Kooy et al. |
| 5,457,951 A | | 10/1995 | Johnson et al. |
| 5,626,019 A | | 5/1997 | Shimizu et al. |
| 6,367,258 B1 | | 4/2002 | Wen et al. |
| 6,920,759 B2 | * | 7/2005 | Wakana et al. ............... 60/726 |
| 7,028,481 B1 | * | 4/2006 | Morrow ....................... 60/649 |
| 2003/0005698 A1 | | 1/2003 | Keller |
| 2006/0174627 A1 | * | 8/2006 | McQuiggan ................. 60/772 |

FOREIGN PATENT DOCUMENTS

| | | |
|---|---|---|
| JP | 10238368 A | 9/1998 |
| JP | 2003056312 A | 2/2003 |
| JP | 2003214741 A | 7/2003 |

* cited by examiner

Primary Examiner—William H. Rodriguez

(57) ABSTRACT

A gas turbine cycle that utilizes the vaporization of liquefied natural gas as a source of inlet air chilling for a gas turbine. The cycle uses regeneration for preheating of combustor air and offers the potential of gas turbine cycle efficiencies in excess of 60%. The systems and methods permit the vaporization of LNG using ambient air, with the resulting super cooled air being easier to compress and/or having fewer contaminants therein. As the air is easier to compress, less energy is needed to operate the compressor, thereby increasing the efficiency of the system. A portion of the vaporized natural gas may be used as the combustion fuel for the gas turbine system, thereby permitting multiple turbines to be operated using a single topping cycle. In alternative embodiments, the vaporization of the LNG may be used as part of a bottoming cycle to increase the efficiencies of the gas turbine system.

9 Claims, 3 Drawing Sheets

VAPORIZATION OF LIQUEFIED NATURAL GAS FOR INCREASED EFFICIENCY IN POWER CYCLES

CROSS REFERENCE TO RELATED APPLICATIONS

This application claims priority to U.S. Provisional Patent Application No. 60/529,250, filed Dec. 13, 2003.

FIELD OF THE INVENTION

This invention is directed generally to turbine systems, and more particularly to turbine systems utilizing the thermodynamic heat sink potential of liquefied natural gas.

BACKGROUND

One method of thermal power generation is by gas turbines that are powered by the combustion of some fuel, and it may be applied to power plants having a capacity up to several hundreds of thousand of kilowatts. Additionally, there are methods of thermal power generation that are commonly called combined cycle power generation. These methods are based on a gas turbine cycle and a steam cycle in combination. The steam cycle is powered by the exhaust energy from the gas turbine cycle. They offer an advantage of being started and stopped easily and allow easy control for load variation. Moreover, these combined methods of power generation are more efficient than the gas turbine cycle or ordinary steam power generation alone The general trend in combined cycle power generation in regions where natural gas availability is an issue is toward firing the gas turbine with revaporized liquefied natural gas which is a clean fuel. Combined cycle power generation involving liquefied natural gas will become more important in the countries and areas where energy demand is expected to increase in the future. Liquefied natural gas is desirable from the standpoint of stable supply in view of its huge reserves and also from the standpoint of environmental protection.

In the meantime, a gas turbine has the disadvantage of decreasing in output with increasing atmospheric temperature. This is caused by an increase in atmospheric temperature that decreases the density of air being supplied to the gas turbine. The lower the density of air, the smaller the mass of air in the same volume. Unfortunately, atmospheric temperature is highest in the afternoon in summer when the electric power consumption and demand can be high due to increase in operation of equipment such as air conditioners. In other words, the output of gas turbines is lowest when the electric power consumption is highest. This prevents high efficiency of the gas turbine cycle for power generation. As such, there have been attempts to improve the efficiencies of gas turbine plants. In one method, it has been proposed to extend a gas turbine plant with a waste-heat boiler and to combine the gas turbine plant with a steam turbine plant. The gas turbine and the steam turbine each drive their own generator or drive a single generator via a common shaft. These combination plants, referred to as combined cycle plants, are generally distinguished by their very good energy conversion efficiencies which range in the order of magnitude from 50 to 58%. These high efficiencies result from the cooperation of a gas turbine with at least one steam turbine plant. The gas turbine exhaust gases are passed through a waste-heat boiler and the residual heat potential of these waste-gases is utilized for producing the steam required for feeding the steam turbine. LNG has been used in combined cycle plants as a combustion energy source.

LNG is normally transported as a cryogenic liquid in specialized vessels. At the receiving terminal this cryogenic liquid, which is approximately at atmospheric pressure and at a temperature of around −260° F., has to be regasified and fed to a distribution system at ambient temperature and at a suitably elevated pressure, typically ranging up to 80 atmospheres. The liquid may be pumped to the required pressure so that when heat is added and it is regasified, no compression of the resultant natural gas is required.

Although many suggestions have been made and some installations have been built to utilize the large cold potential of the LNG, in most receiving terminals the cold potential is wasted and the LNG is simply heated with a large flow of sea water which has to be applied in such a manner as to avoid ice formation.

At a few terminals, the cold potential is utilized in air separation plants or similar cryogenic installations or for refrigeration purposes in the freezing and storing of foodstuffs. It has also been proposed to use the cold LNG as a heat sink in a power cycle to generate electrical energy. A number of possible cycles have been proposed which seek to overcome the difficulties caused by the large temperature difference through which the LNG is heated and the particular shape of the warming curve. However, it has been found that even with relatively simple cycles only a small part of the available cold potential can be utilized. Proposals to increase the efficiency employ more complex cycles involving a large number of turbines operating between different pressure levels.

Accordingly what is needed is a gas turbine system that offers increased efficiencies as to prior art gas turbine systems. Also what is needed is a gas turbine system that utilizes liquefied natural gas as a heat sink as well as a possible source of fuel for the turbine system.

SUMMARY OF THE INVENTION

This present invention provides a gas turbine cycle that utilizes the vaporization of liquefied natural gas (LNG) as a source of significant inlet air chilling. This process along with a combustion and expansion process, which efficiently uses regeneration for preheating of combustor air, offers the potential of gas turbine cycle efficiencies in excess of 60%. The systems of the present invention permit the vaporization of LNG using ambient air, with the resulting super cooled air being easier to compress and/or having fewer contaminants therein. As the air is easier to compress, less energy is needed to operate the compressor, thereby increasing the efficiency of the system. A portion of the vaporized natural gas may be used as the combustion fuel for the gas turbine system, thereby permitting multiple turbines to be operated using a single topping cycle. In alternative embodiments, the LNG vaporization may be used as part of a bottoming cycle that, with a conventional topping cycle, is still capable of increasing the efficiency of a gas turbine system.

These and other embodiments are described in more detail below.

BRIEF DESCRIPTION OF THE DRAWINGS

Other objects, features and advantages of the present invention will become apparent upon reading the following detailed description, while referring to the attached drawings, in which.

DETAILED DESCRIPTION OF THE INVENTION

Figure 1:
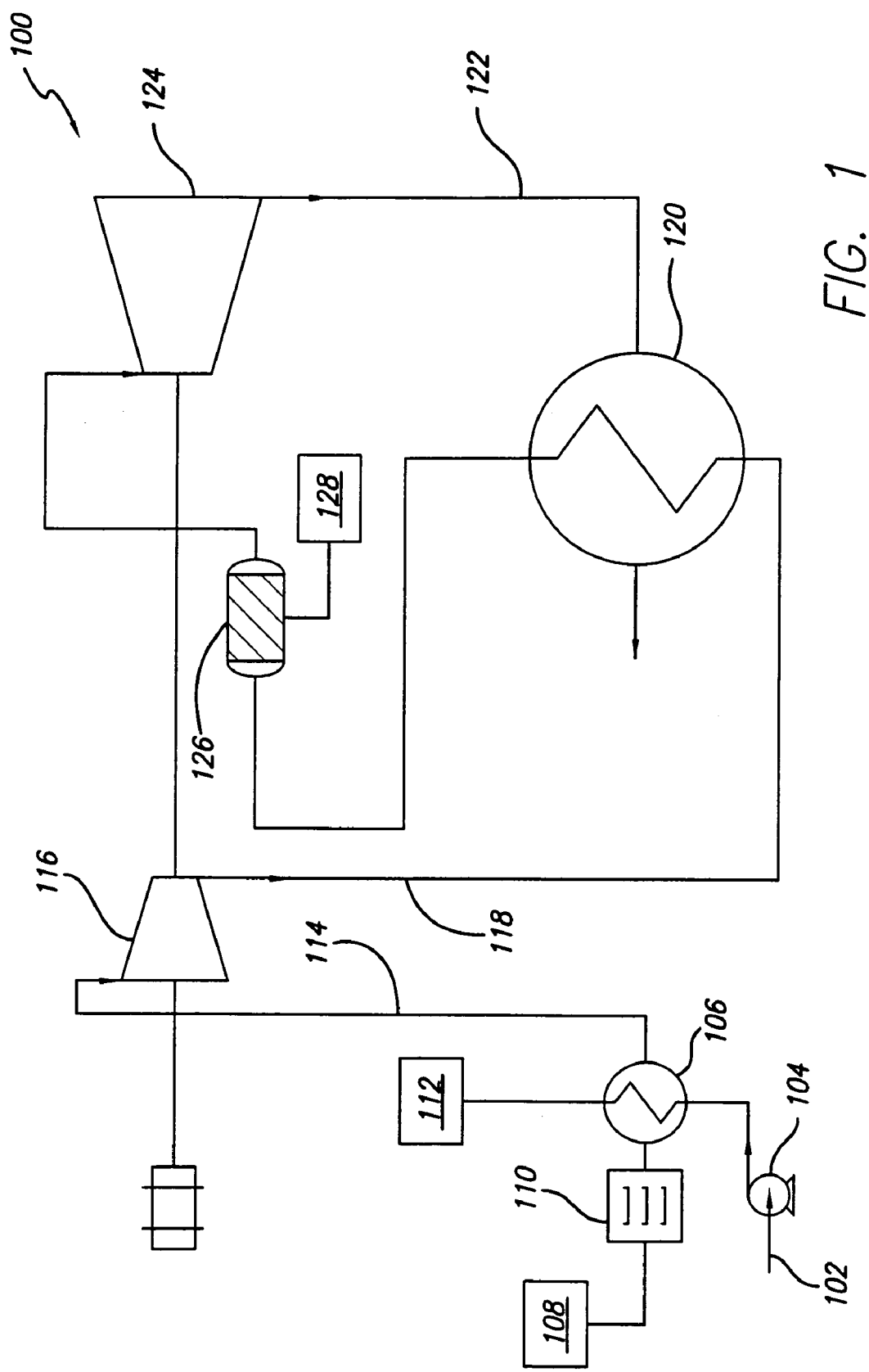
FIG. 1 shows a gas turbine topping cycle utilizing liquefied natural gas according to one embodiment of the present invention.

The present invention is more particularly described in the following description and examples that are intended to be illustrative only since numerous modifications and variations therein will be apparent to those skilled in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of."

The present invention provides a gas turbine topping cycle that utilizes the vaporization of liquefied natural gas as a source of inlet air chilling for a gas turbine. The cycle offers the potential of gas turbine cycle efficiencies in excess of 60%. The present invention vaporizes LNG using ambient air, with the resulting super cooled air being easier to compress. As the air is easier to compress, less energy is needed to operate the compressor, thereby increasing the efficiency of the system. The full efficiency potential of the LNG heat sink may only be realized if the post compression air can be preheated to higher temperatures prior to combustion. Other operating efficiencies may also be realized based upon different operating parameters.

In one embodiment, the gas turbine system of the present invention includes a gas turbine topping cycle that provides an LNG cycle development designed to deliver a significant output at greater than 60% thermodynamic efficiency while meeting the requirements for LNG vaporization. This topping cycle may be accomplished using different cycle configurations. In one embodiment, the gas turbine system uses the LNG heat sink potential applied to the chilling of compressor inlet air. This embodiment provides a gas turbine topping cycle that is capable of taking full advantage of the LNG heat sink.

In this embodiment, the LNG is vaporized by flowing the LNG past air that is to be sent to the compressor section of the gas turbine cycle. As the LNG temperature during storage may be less than about −260° F., it is possible to develop a vaporization process that utilizes ambient air as the heat source. During the vaporization process, this air is chilled to extremely cold conditions and delivered to a gas turbine cycle optimized around the minimized compressor work associated with compression of this cold inlet air and the regenerative heating of this compressed air prior to the combustion process.

As such, in this embodiment, the LNG is flowed past the air. The LNG is at a temperature of less than about −260° F., while the ambient air is at a temperature of about 65° F. After passing through the heat exchanger, the air has been significantly cooled, while the LNG has been vaporized and is at a temperature closer to the ambient air temperature. The final temperatures of the air and the LNG after vaporization may vary depending on a variety of different factors. Nevertheless, as the cooled air is being sent to a compressor, the more beneficial embodiments significantly cool the air to temperatures below about −100° F., thereby making the cooled air easier to compress such that less work and/or energy is needed to compress the air, thereby increasing the efficiency of the system. In alternative embodiments, the air is cooled to temperatures below about −150° F. In still other alternative embodiments, the air is cooled to temperatures below about −200° F.

The temperature of the vaporized natural gas again may vary. Depending on the volume of the air to be cooled, the volume of the LNG to be vaporized, the selected temperature of the air, and/or the selected temperature of the vaporized natural gas after passing through the heat exchanger, the temperature of the vaporized natural gas again may vary over a wide range. In one embodiment, the temperature of the vaporized natural gas may be greater than about −50° F. In an alternative embodiment, the temperature of the vaporized natural gas may be greater than about 0° F. In still another embodiment, the temperature of the vaporized natural gas may be greater than about 40° F.

Again, depending on the volume of the air to be cooled, the volume of the LNG to be vaporized, the selected temperature of the air, and/or the selected temperature of the vaporized natural gas after passing through the heat exchanger, the flow rates of the air to the LNG may vary. In one embodiment, wherein the air is cooled to a temperature of about −220° F. and the LNG is vaporized to a temperature of about 40° F., the mass ratio of the air flow rate to the LNG flow rate is about 5 to 1. If warmer air and/or warmer natural gas are beneficial, then the flow mass ratio of the air flow rate to the LNG flow rate may be about 10 to 1 or higher. Alternatively, if colder air and/or colder natural gas are beneficial, then the flow mass ratio of the air flow rate to the LNG flow rate may be about 3 to 1 or lower.

As it beneficial for the air to remain free from impurities before and during chilling, it is beneficial to use a heat exchanger wherein the ambient air and the LNG do not contact one another during the heat exchange. In one embodiment, a shell and tube heat exchanger is used to cool the air and vaporize the LNG. However, any heat exchanger capable of cooling air and vaporizing LNG without contacting the two fluid streams may be used in the present invention.

In an alternative embodiment, the air may first be delivered to a drying and/or conditioning stations such that all moisture and/or other condensables are removed. This may be done to avoid the formation of "ice" within the heat transfer or compression equipment. The air would then be passed to the LNG vaporizer where it would be cooled.

Once the air has been cooled, it is then sent to a compressor which is then pressurized to support the requirements of the combustion and expander systems. As the air is much more dense than ambient air, the amount of work needed to compress the air is significantly reduced as compared to the amount of work or energy needed to compress ambient air. This is one aspect of the present invention that helps increase the efficiency of the overall system.

Once the air has been compressed, the air is at an increased temperature, but generally not at a temperature such that it may effectively be used in the combustion process. As such, the air may, in one embodiment, be warmed. This may be accomplished using a regenerative heat exchanger. In one embodiment, wherein the air is about −220° F., the temperature of the air after compression is about 100° F. This temperature may be slightly higher if the air was warmer than about −220° F. when sent to the compressor.

In one embodiment, the air is heated to a temperature of from about 700 to about 800° F. prior to combustion. This may be accomplished, in one embodiment, by using the exhaust gases from the turbine to heat the compressed air to the selected temperature. By using the exhaust gases from the turbine to heat the compressed air prior to combustion, less combustion fuel is needed to effectively operate the combustion process, thereby increasing the efficiency of the overall process. Also, by removing excess heat from the exhaust gases, the gases may be more easily discharged into the environment without additional treatment.

After being heated, the compressed air is sent to the combustor wherein it is used, along with a combustion fuel, to operate the turbine. The combustion fuel may be any fuel capable of being used in a gas turbine system. In one embodiment, the combustion fuel is natural gas. In yet another embodiment, the combustion fuel is natural gas that was vaporized by the previously described process. As the compressed air has been heated by the exhaust gases from the turbine, less combustion fuel is needed. As such, in those embodiments wherein a portion of the LNG that has been vaporized is used as the combustion fuel, the remaining vaporized natural gas may be sent to a pipeline.

Alternatively, as only a portion of the LNG that has been vaporized is needed, in an alternative embodiment of the present invention, the LNG vaporization portion of the present invention may be combined with a plurality of gas turbines as one source of LNG may be used to operate multiple turbines.

Referring now to FIG. 1, one embodiment of a gas turbine system according to the present invention is set forth. In this embodiment, the system 100 includes a liquefied natural gas source 102 that may be sent, via a pump 104, to an LNG vaporizing heat exchanger 106. Inlet air 108 may also be sent to the heat exchanger 106. In some embodiments, an air drying and conditioning unit 110 may be utilized to remove water and/or other particulates from the air prior to cooling.

In the heat exchanger 106, the LNG is vaporized by heating using the ambient air 108 as the heat source, which results in super cooling of the air. The vaporized natural gas may be sent to a pipeline 112.

The cooled air 114 may be sent to a compressor 116, wherein the cooled air 114 is compressed. A generator 118, which may be powered by the system 100, may operate the compressor 116, although the turbine 124 actually powers the compressor 116 with the net work being used to drive the compressor 116. As the air 114 has been cooled prior to compression, less energy is needed by the compressor 116 to compress the air.

The compressed air 118 may then be sent to a heat exchanger 120 wherein exhaust gas 122 from the turbine 124 may be used to heat the compressed air 118 prior to combustion in the combustor 126. A fuel supply 128 is used to power the combustor 126. The fuel supply 126 may be any fuel source including, but not limited to, vaporized natural gas.

Accordingly, the present invention provides a method for cooling inlet air while vaporizing LNG. As the inlet air is cooled to much lower temperatures than prior art systems, which chill air to about 15° F., the present invention offers a much more efficient system than prior art systems as less energy is needed to compress the air after being chilled. In addition, the optional regenerative heating step of using exhaust gases to heat the compressed air prior to combustion also increases the efficiencies of the topping cycle of the present invention by increasing the temperature of the compressed air prior to combustion, such that the combustion process requires less fuel than one using cooler air.

Nevertheless, while the new gas turbine cycle of the present invention provides greater efficiencies than prior art gas turbine systems, the present invention, in various alternative embodiments, also provides for further modification of a gas turbine cycle using LNG that also result in higher efficiencies than prior art systems.

For example, in one embodiment, the system of the present invention utilizes the new gas turbine topping cycle, but further pressurizes the LNG prior to being vaporized. In this embodiment, the pressurized LNG is then vaporized by cooling the inlet air and then expanded through a turbine. This results in the generation of net work, which may then be used to drive a compressor, such as the compressor that compresses the chilled air or to drive a generator for production of electricity. After passing through the turbine, the natural gas may, in part, be used as the combustion fuel in the combustor, or the entirety of the natural gas may be sent to a pipeline.

In yet another alternative embodiment, the chilled air may be pressurized to a higher pressure in the compressor. Then, after leaving the compressor, the pressurized air may then be expanded in a secondary turbine prior to being combusted in the combustor. This expansion via the secondary turbine would result in the generation of net work from the secondary turbine. As with the previous embodiments, the combusted air may then be expanded in the primary turbine, with the exhaust gas being used to heat the air in a regenerative heating cycle prior to combustion of the air.

In still another alternative embodiment, a combination of the two previous embodiments may be carried out wherein both the chilled air and vaporized LNG are pressurized and expanded in secondary turbines to result in the generation of net work from both pressurized fluids.

In yet other alternative embodiments, the LNG vaporization stage may be used with a conventional gas turbine topping cycle, but wherein the LNG vaporization is included in a new bottoming cycle that still results in an increase in the efficiency of the overall gas turbine cycle. Examples of cycles that may be utilized include, but are not limited to, Brayton cycles or Rankine cycles. In these embodiments, the present invention utilizes LNG's low temperature heat sink potential as a source for cooling of the working fluid within the cycle, employing a mechanically simple system that does not restrict the various natural gas flows required.

In these embodiments, the LNG may be vaporized as part of a bottoming cycle, not in conjunction with chilling inlet air. As such, a standard gas turbine topping cycle is used. In a standard gas turbine topping cycle, air is compressed in a compressor and then combusted with a combustion fuel in a combustor. The combustion products are then expanded using a turbine. However, instead of venting the exhaust gases, these gases are used with a bottoming cycle of the present invention that results in the vaporization of LNG. A portion of the vaporized natural gas, as with the previous embodiments, may be the combustion fuel. Alternatively, all of the vaporized natural gas may be sent to a pipeline.

In these alternative embodiments, these alternate bottoming cycles use LNG vaporization as a heat sink and offer the potential of significant efficiency improvements. Selection of the bottoming cycle configuration and working fluid may be chosen to provide the most beneficial optimization of the heat transfer and thermodynamic performance of the system. In addition, selection of fluids with low freezing points avoids the technical challenges associated with avoidance of "ice" formation in the LNG vaporizer, as may result when the LNG vaporization is used to chill air.

Figure 2:
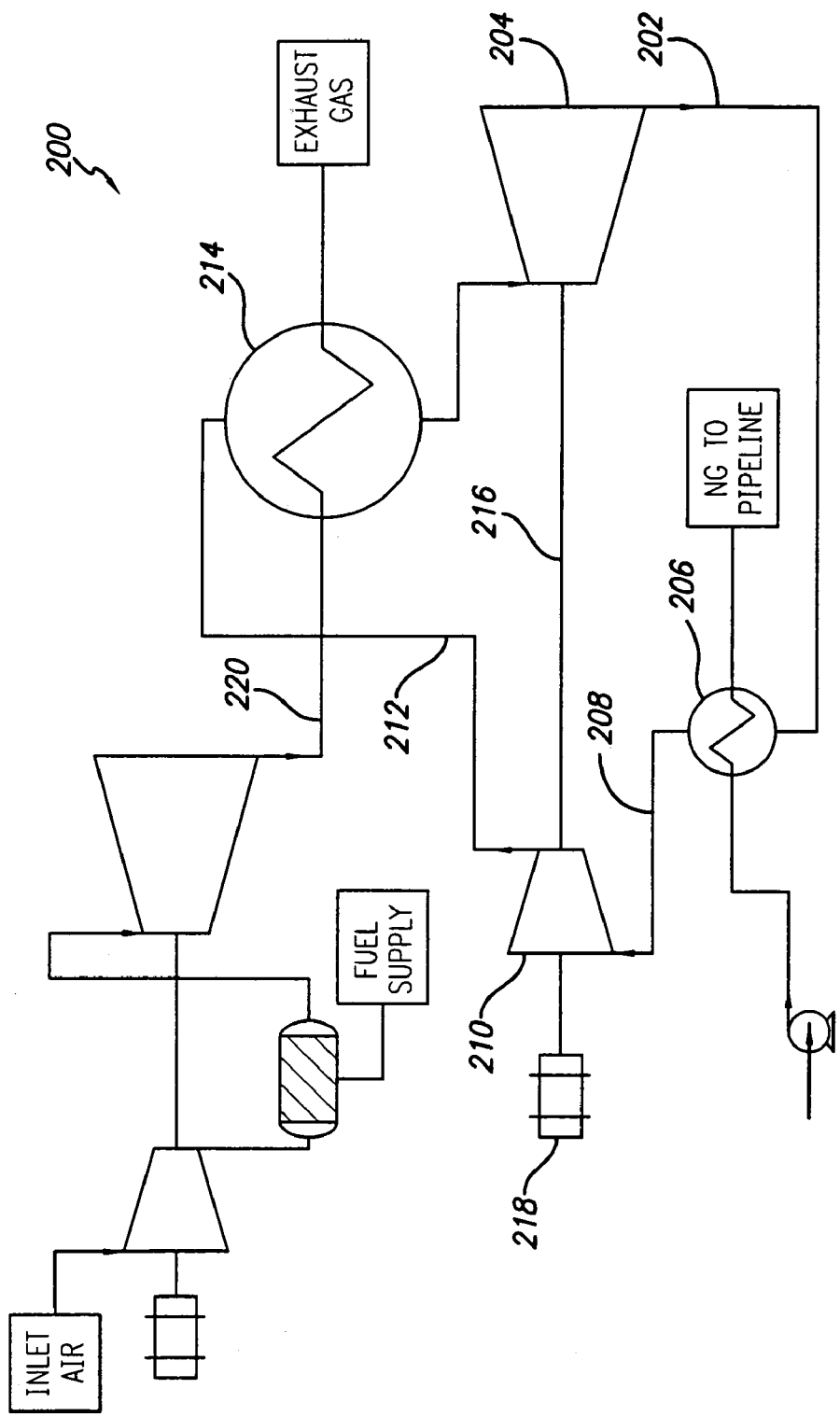
FIG. 2 shows a standard gas turbine topping cycle and a Brayton bottoming cycle utilizing LNG vaporization according to an alternative embodiment of the present invention.
Figure 3:
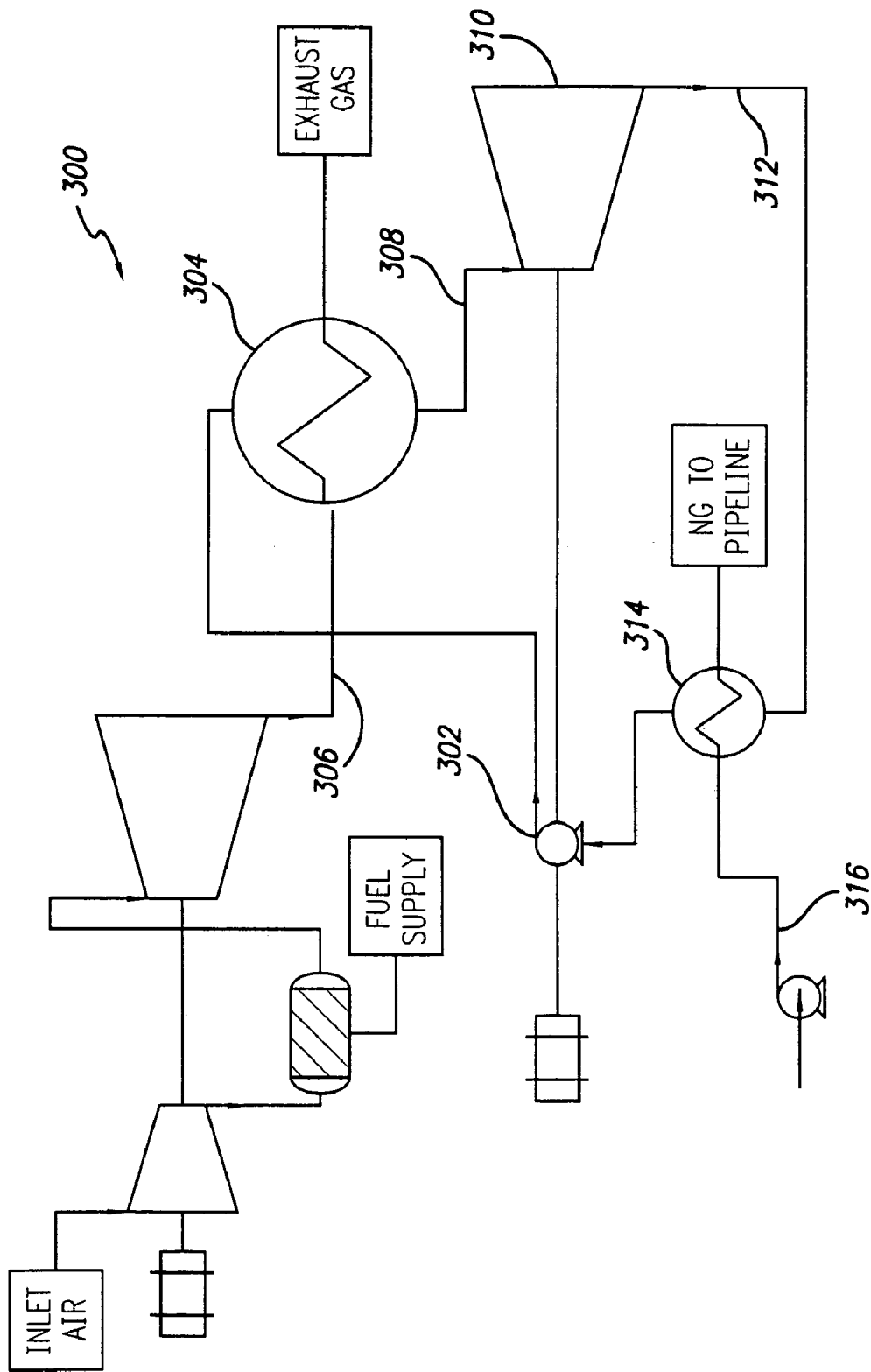
FIG. 3 shows a standard gas turbine topping cycle and a Rankine bottoming cycle utilizing LNG vaporization according to an alternative embodiment of the present invention.

As shown in greater detail in FIG. 2 and FIG. 3, examples of these embodiments are provided wherein alternate methods for taking advantage of the heat sink potential of LNG are described. All of the configurations utilize some gas turbine topping cycle with an alternate bottoming cycle arrangement that is configured to use the LNG vaporization as the heat sink in some closed cycle. As previously discussed, the cycles analyzed may include, but are not limited to, various Brayton cycles and/or Rankine cycles with various working fluids.

In one embodiment, the bottoming cycle is a nitrogen Brayton bottoming cycle. In this closed cycle 200, shown in greater detail in FIG. 2, the exhaust energy 202 from the turbine 204 serves as the heat source with the LNG vaporization 206 serving as heat sink. Cold nitrogen 208 from the LNG vaporizer 206 is delivered to a compressor 210. Upon compression, the nitrogen 212 passes through a heat recovery heat exchanger 214 which recovers the exhaust energy from the primary gas turbine 220. The hot nitrogen is expanded across a turbine 204 for the extraction of power, and the exit flow 202 is sent to the LNG vaporizer 206 to be cooled for the process to continue. The nitrogen compressor and expander are connected by a common shaft 216 attached to a generator 218.

In an alternative embodiment, regeneration may be added to the nitrogen Brayton bottoming cycle. The exhaust energy of the expander may be used to preheat the nitrogen prior to delivery to the exhaust energy recovery heat exchanger. In still other alternative embodiments, a Brayton cycle may be used, but wherein the working fluid was something other than nitrogen. Examples of alternative working fluids include, but are not limited to, argon and carbon dioxide.

In yet another embodiment, the bottoming cycle may be a carbon dioxide Rankine bottoming cycle. In this cycle 300, shown in greater detail in FIG. 3, liquid carbon dioxide 302 is pumped to a heat exchanger 304 that exchanges energy with the turbine exhaust 306. The carbon dioxide is vaporized and superheated and is then delivered 308 to an expander 310. Upon expansion in a turbine 310, the exhausted carbon dioxide is then delivered 312 to a LNG vaporizer 314, where the heat sink potential of the LNG 316 is used to condense the LNG to liquid conditions. To have a comfortable margin above the freezing point, the temperature of the system may be limited to −45° F. At this temperature, the saturation pressure is on the order of 135 psia. This limits the expansion ratio across the expander as conditions at the inlet of the pump (or post condensation) must keep the carbon dioxide in the liquid phase.

In addition to gas turbine systems, the concepts of the present invention may be utilized in any turbine and/or engine system wherein LNG may be used as a consumption fuel.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A gas turbine system comprising:
    a source of liquefied natural gas;
    a working fluid;
    a first heat exchanger capable of vaporizing the liquefied natural gas using heat from the working fluid and cooling the working fluid;
    a second heat exchanger for heating the working fluid from the first heat exchanger using heat from exhaust gases from a first expander; and
    the first expander for expanding the heated working fluid;
    wherein the working fluid is ambient air and wherein the system further comprises:
    a compressor for compressing the cooled air from the first heat exchanger; and
    a combustor for combusting a combustion fuel and the heated compressed air from the second heat exchanger;
    wherein the first expander expands products from the combustor and provides the exhaust gases;
    wherein the first heat exchanger is a shell and tube heat exchanger.

2. The gas turbine system of claim 1, wherein the system further comprises: a standard gas turbine topping cycle;
    wherein the second heat exchanger heats the compressed working fluid from the compressor;
    wherein the heated working fluid from the second heat exchanger is expanded in the first expander and provides the heated working fluid for the vaporization of liquefied natural gas in the first heat exchanger.

3. The gas turbine system of claim 2, wherein the working fluid is selected from nitrogen, argon, carbon dioxide, or a combination thereof.

4. The gas turbine system of claim 1, wherein the system further comprises:
    a standard gas turbine topping cycle; and
    a pump for pressurizing the cooled working fluid from the first heat exchanger;
    wherein the second heat exchanger heats the pressurized working fluid;
    wherein the heated working fluid from the second heat exchanger is expanded in the first expander and provides the heated working fluid for the vaporization of liquefied natural gas in the first heat exchanger.

5. The gas turbine system of claim 4, wherein the working fluid is selected from nitrogen, argon, carbon dioxide, or a combination thereof.

6. A method of operating a gas turbine system comprising the steps of:
    passing liquefied natural gas and a working fluid into a first heat exchanger to vaporize the liquefied natural gas and cool the working fluid;
    pressurizing the cooled working fluid;
    passing the cooled working fluid into a second heat exchanger to heat the cooled working fluid using exhaust gases from a turbine; and
    expanding the heated working fluid from the second heat exchanger using a first expander;
    wherein the working fluid is ambient air and wherein the method further comprises:
    compressing the cooled air from the first heat exchanger using a compressor; and
    combusting a combustion fuel and the heated compressed air from the second heat exchanger using a combustor;
    wherein the step of expanding the heated working fluid expands products from the combustor in the first expander and provides the exhaust gases used in the second heat exchanger;
    wherein the first heat exchanger is a shell and tube heat exchanger.

7. The method of claim 6, wherein the method further comprises:
    using a standard gas turbine topping cycle;
    wherein the compressed working fluid is then sent to the second heat exchanger;

wherein heated working fluid from the second heat exchanger is then expanded in the first expander with the working fluid after expansion providing energy for vaporizing the liquefied natural gas in the first heat exchanger.

8. A method of operating a gas turbine system comprising the steps of:

passing liquefied natural gas and a working fluid into a first heat exchanger to vaporize the liquefied natural gas and cool the working fluid;

pressurizing the cooled working fluid;

passing the cooled working fluid into a second heat exchanger to heat the cooled working fluid using exhaust gases from a turbine; and expanding the heated working fluid from the second heat exchanger using a first expander;

wherein the method further comprises:

using a standard gas turbine topping cycle; and pumping the cooled working fluid from the first heat exchanger to the second heat exchanger;

wherein the working fluid undergoes a phase change from liquid to gas in the second heat exchanger and wherein the working fluid undergoes a phase change from gas to liquid in the first heat exchanger;

wherein heated working fluid from the second heat exchanger is then expanded in the first expander with the working fluid after expansion providing heat for vaporizing the liquefied natural gas.

9. The method of claim 8, wherein the working fluid is selected from nitrogen, argon, carbon dioxide, or a combination thereof.

* * * * *